350-423 SR SEARCH ROO

OR 3,451,743 1065E

Karl Macher
Inventor.

By Karl G. Ross
Attorney

June 24, 1969 K. MACHER 3,451,743

OPTICALLY COMPENSATED VARIFOCAL OBJECTIVE

Filed Dec. 27, 1965 Sheet 2 of 2

Karl Macher
Inventor.

By Karl G. Ross
Attorney

United States Patent Office 3,451,743
Patented June 24, 1969

3,451,743

OPTICALLY COMPENSATED VARIFOCAL OBJECTIVE

Karl Macher, Bad Kreuznach, Germany, assignor to Jos. Schneider & Co. Optische Werke Kreuznach, Bad Kreuznach, Germany, a corporation of Germany
Filed Dec. 27, 1965, Ser. No. 516,372
Claims priority, application Germany, Dec. 28, 1964, Sch 36,311
Int. Cl. G02b *15/00*
U.S. Cl. 350—176 4 Claims

ABSTRACT OF THE DISCLOSURE

A four-component optically compensated variable-focal-length objective is disclosed. The first and third components are positive and ganged together for concurrent axial displacement. The other components are stationary, the second being negative and the fourth comprising a front negative element to render the preceding portion of the objective nearly a focal and a basic objective member. Varifocal ratios of up to 1:3 with numerical apertures of up to 1.8 are achieved. Four embodiments are disclosed.

My present invention relates to a varifocal objective system of the type wherein two fixed components are interleaved with two movable components, the latter being ganged for joint axial displacement at the same rate in a manner substantially compensating for the shift, due to a change in overall focal length, of the image plane of the system from a predetermined position whereby the deviations of the image plane from that position are held to a minimum.

The theory of such four-component varifocal systems is well known per se, e.g., from U.S. Patents Nos. 2,778,-272, and 3,051,052. In accordance with this theory, the image plane oscillates about a neutral position which it traverses up to four times during a complete displacement stroke of the movable components, the peaks of the oscillation being minimized by a suitable choice of parameters.

As compared with conventional varifocal systems wherein two adjoining components are concurrently displaceable at different rates for an exact compensation of image-plane deviation, e.g., as disclosed in commonly assigned U.S. Patent No. 3,057,257, issued Oct. 9, 1962, to G. Klemt and me, systems with rigidly interconnected alternate components have the advantage of mechanical simplicity and greater compactness.

In prior objectives of this type it has been the practice to make the first and third components of the system (as seen from the object side) stationary and to interconnect the second and fourth components for joint displacement, the fourth component being usually followed by one or more additional lenses fixedly positioned to modify (e.g., to shorten) the overall focal length of the four-component group. Generally, the relatively large space present between the movable fourth component and the additional lens or lenses was utilized for the interposition of auxiliary optical elements such as diaphragm, shutters and/or reflex prisms.

The axial mobility of one of the lens members bounding the diaphragm space is an inconvenience from the viewpoint of mechanical assembly and is also optically disadvantageous since a displacement of this movable lens member over its full range entails a considerable change in the ray paths through the diaphragm and since this lens member must be dimensioned to insure full illumination of that diaphragm in all its positions.

An object of my present invention is to provide an improved system of this general type which avoids the shortcomings set forth above.

A more particular object of this invention is to provide a varifocal system of the character described which, for a varifocal ratio between about 1:2.5 and 1:3, affords full illumination of the image field in all positions of adjustment when used, for example, in a camera for 8-mm. motion-picture film having the enlarged frame size of 4.22 x 5.69 mm.

It is also an object of this invention to provide a four-component varifocal group with interleaved movable and stationary components which can be used in conjunction with a basic four-lens objective of the general type described in the above-identified Klemt et al. patent and in my copending application Ser. No. 488,957, filed Sept. 21, 1965.

In accordance with this invention I provide a varifocal objective system in which, in contradistinction to the conventional arrangements described above, the first and third components of a four-component group are jointly movable whereas the second and fourth components are stationary. These movable first and third components are positively refracting while the stationary second component is of negative refractivity. The stationary fourth component also includes a negative lens member, immediately following the positive third component, and further includes a positive lens or lens group or basic objective which is separated from the negative lens member by a diaphragm space and which, in effect, may be regarded as part of the stationary fourth component.

In accordance with another feature of my invention, the four-component group preceding the basic objective is negatively refracting and of low power, compared with the positive overall power of the complete system (at least in its median position of adjustment) and also compared with the positive power of the basic objective, so that the focal length of this group has an absolute value substantially greater than the mean overall focal length of the system. The dispersive effect of this group results in a slight increase in the back-focal length of the basic objective which simplifies the assembling of the parts in a motion-picture or other camera of small dimensions.

In order to insure adequate illumination of the image field even when the system operates near the lower end of its varifocal range, i.e., when closeups are taken, another feature of my invention provides that the first three components should be single lens members, with the first component advantageously designed as a doublet, the positive first and third lens members having their front surfaces more strongly curved than their rear surfaces whereas the negatively refracting second lens member (as well as, advantageously, the similarly refractive fourth lens member) has its rear surface more strongly curved than its front surface. More particularly, if $r1$, $r4$, $r6$ are the radii of curvature of the front surfaces of the first three lens members and $r3$, $r5$, $r7$ are the radii of the respective rear surfaces, with $r2$ designating the radius of the cemented internal surface of the front doublet, and if $f_I$, $f_{II}$, $f_{III}$ are the individual focal lengths of these components, the relationship of the absolute values of these radii and focal lengths should range for optimum performance within the following limits:

$$0.7f_I<r1<f_I$$
$$0.7f_I<r2<f_I$$
$$f_I<r3<3f_I$$
$$2f_{II}<r4<30f_{II}$$
$$0.5f_{II}<r5<f_{II}$$
$$0.5f_{III}<r6<f_{III}$$
$$4f_{III}<r7$$

Advantageously, for further improvement, the front and rear surfaces of the negative fourth lens member immediately preceding the diaphragm space should have radii $r8$, $r9$ whose absolute values are related to the individual focal length $f_{IV}$ of the fixed fourth component (which includes the basic objective) according to the following inequalities:

$$3f_{IV}<r8$$
$$0.5/_{IV}<r9<2f_{IV}$$

The basic objective, in a preferred embodiment, also consists of four air-spaced members including, from front to rear, a first positive singlet adjoining the diaphragm space, a second positive singlet, a preferably biconcave negative singlet and a preferably biconvex third positive singlet. With the exception of this last singlet, the lenses of the basic objectives advantageously also satisfy the requirement that the front surfaces of the positive members and the rear surfaces of the negative members be more strongly refractive than their other outer surfaces.

Again, if the front surfaces of the four singles constituting this basic objective have radii $r10$, $r12$, $r14$, $r16$ and their rear surfaces have radii $r11$, $r13$, $r15$, $r17$, the absolute values of these radii advantageously bear the following relationship to the focal length $f_{IV}$:

$$f_{IV}<r10<2f_{IV}$$
$$f_{IV}<r11<5f_{IV}$$
$$0.5f_{IV}<r12<f_{IV}$$
$$0.5f_{IV}<r13<3f_{IV}$$
$$0.5f_{IV}<r14<2f_{IV}$$
$$0.3f_{IV}<r15<f_{IV}$$
$$0.6f_{IV}<r16<f_{IV}$$
$$0.5f_{IV}<r17<f_{IV}$$

The invention will be described in greater detail with reference to the accompanying drawing in which:

FIG. 1 diagrammatically illustrates a varifocal objective system according to this invention;

Figure 1:
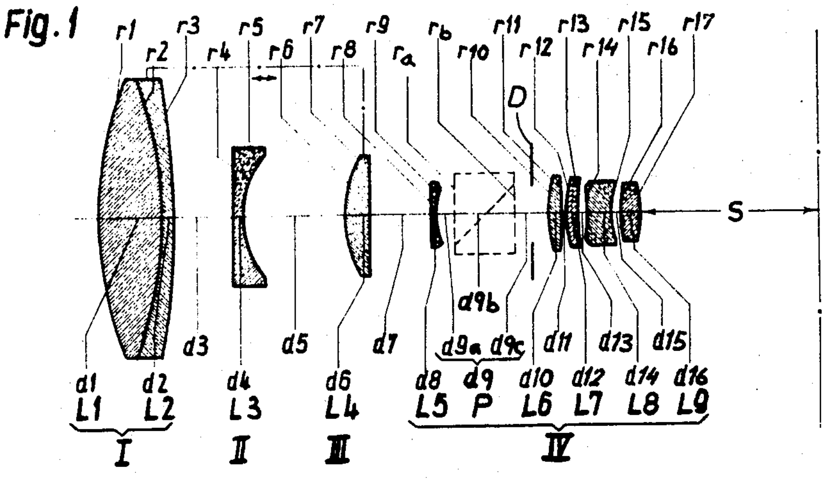

The system shown in FIG. 1 consists of four air-spaced components I, II, III and IV of which the first and third, i.e., components I and III, are mechanically interconnected for joint axial displacement relative to the other, fixed components of the system. The front component I is a doublet whose constituent lenses L1 (radii $r1$, $r2$ and thickness $d1$) and L2 (radii $r2$, $r3$ and thickness $d2$) are cemented together along a forwardly concave dispersive surface. This movable component is separated by a variable air space $d3$ from a biconcave singlet L3 (radii $r4$, $r5$ and thickness $d4$) which constitutes the second component II and is in turn spaced by another variable distance $d5$ from the third component III here shown as a biconvex singlet L4 with radii $r6$, $r7$ and thickness $d6$. A third variable air space $d7$ intervenes between component III and the first lens member L5, also a negative singlet, of the fixed rear component IV; this singlet is shown in FIG. 1 as a negative meniscus with radii $r8$, $r9$ and thickness $d8$. The other lenses of component IV, disposed beyond a relatively large diaphragm space $d9$, are a positive singlet L6 (radii $r10$, $r11$ and thickness $d10$), another positive singlet L7 (radii $r12$, $r13$ and thickness $d12$), a biconcave negative singlet L8 (radii $r14$, $r15$ and thickness $d14$), and a biconvex positive singlet L9 (radii $r16$, $r17$ and thickness $d16$), the intervening air spaces having been designated $d11$, $d13$ and $d15$.

A reflex prism P, with plane surfaces designated $r_a$ and $r_b$, and a diaphragm D have been shown interposed between lenses L5 and L6, the intervening diaphragm space $d9$ being thus constituted by the sum of a space $d9a$ separating the lens L5 from prism P, the thickness $d9b$ of that prism and the separation $d9c$ between the prism and the first vertex of lens L6.

In the following Table I there are listed representative values, in units of length here taken as millimeters, of the radii of curvature $r2$ to $r17$ and the thicknesses and separations $d1$ to $d16$ of lenses L1 to L9, and prism P of the system shown in FIG. 1, together with their refractive indices $n_d$ (taken for the spectral D line of helium having the wavelength $\lambda=5876$ A.) and their Abbé numbers $\nu$. The table also indicates the refractive power $\Delta n/r$ of each lens surface, conventionally represented by the quotient of the difference ($\Delta n$) of the refractive indices on opposite sides of the surface and the respective radius of curvature ($r$). It may be mentioned that, in this example and others given hereinafter, minor deviations of these refractive powers from the indicated values may be tolerated, amounting to not more than a fraction of the mean overall power of the system defined as the reciprocal of its mean overall focal length $$f_{med}\sqrt{f_{max}\cdot f_{min}}$$

where $f_{max}$ and $f_{min}$ are the upper and lower limits of the varifocal range. Similarly, the various thicknesses and separations may depart, by not more than a fraction of the absolute value of $f_{med}$, from those specifically given. The refractive indices $n_d$ and the Abbé numbers could also vary within tolerance ranges of about ±2% and ±10%, respectively.

TABLE I

| Lenses | | Radii | Thicknesses and Separations | $n_d$ | $\nu$ | $\Delta n/r$ |
|---|---|---|---|---|---|---|
| I | | $r1$ =+50.91 | | | | +0.0121864 |
| | L1 | | $d1$ =8.85 | 1.6204 | 60.3 | |
| | | $r2$ =−55 61 | | | | −0.0033226 |
| | L2 | | $d2$ =1.90 | 1.8052 | 25.5 | |
| | | $r3$ =−125.86 | | | | +0.0063974 |
| | | | $d3$ =8.70 | Air space (variable) | | |
| | | $r4$ =−327.60 | | | | −0.0018938 |
| II | L3 | | $d4$ =1.50 | 1.6204 | 60.3 | |
| | | $r5$ =+13.82 | | | | −0.0448921 |
| | | | $d5$ =14.81 | Air space (variable) | | |
| | | $r6$ =+17.38 | | | | +0.0332825 |
| III | L4 | | $d6$ =3.60 | 1.5785 | 41.7 | |
| | | $r7$ =∞ | | | | ------------ |
| | | | $d7$ =8.69 | Air space (variable) | | |
| IV | | $r8$ =+72.09 | | | | +0.0086060 |
| | L5 | | $d8$ =1.0 | 1.6204 | 60.3 | |
| | | $r9$ =+12.44 | | | | −0.0498721 |
| | | | $d9a$=3.06 | | | |
| | | $r_a$ =∞ | | | | ------------ |
| | P | | $d9b$=9.0 | 1.5168 | 64.2 | |
| | | $r_b$ =∞ | | | | ------------ |
| | | | $d9c$=5.80 | Diaphragm space | | |
| | | $r10$=+22.02 | | | | +0.0356235 |
| | L6 | | $d10$=1.92 | 1.7844 | 43.8 | |
| | | $r11$=−57.37 | | | | +0.0136731 |
| | | | $d11$=0.04 | Air space | | |
| | | $r12$=+14.49 | | | | +0.0513457 |
| | L7 | | $d12$=2.15 | 1.7440 | 44.9 | |
| | | $r13$=+37.67 | | | | −0.0197505 |
| | | | $d13$=1.0 | Air space | | |
| | | $r14$=−27.65 | | | | −0.0291204 |
| | L8 | | $d14$=3.90 | 1.8052 | 25.5 | |
| | | $r15$=+9.89 | | | | −0.0814135 |
| | | | $d15$=1.30 | Air space | | |
| | | $r16$=+15.87 | | | | +0.0449275 |
| | L9 | | $d16$=2.85 | 1.7130 | 53.9 | |
| | | $r17$=−13.58 | | | | +0.0525036 |
| | | | $\Sigma d$=80.07 | | | |

The system represented by the foregoing Table I has a mean overall focal length $f_{med}$ of 15 mm., a relative aperture of 1:18 and a back-focal length $s$=13.76 mm., this back-focal length varying by not more than about 0.01 throughout the varifocal range which extends from $f_{min}$=9.5 mm. to $f_{max}$=23 mm.

Figure 4:
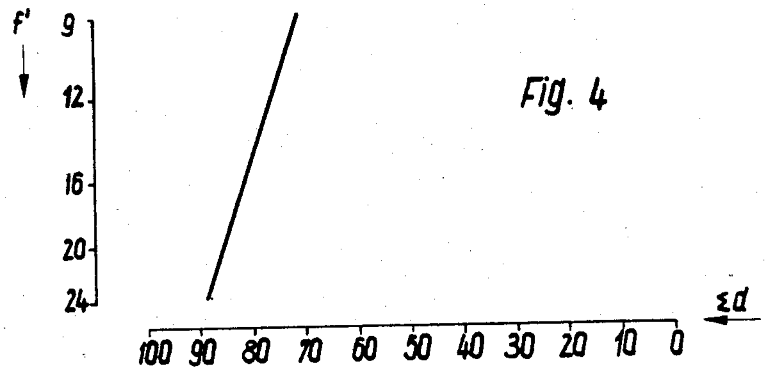
FIGS. 4–6 are graphs illustrating the variations in the overall focal length of the systems of FIGS. 1 to 3, respectively, as a function of their total axial length which in turn depends on the positions of their movable components.

The values of the variable air spaces $d3$, $d5$ and $d7$ are given in the following Table Ia for the extreme positions corresponding to $f_{min}$ and $f_{max}$. The substantially linear relationship between $f$ and the total axial length $\Sigma d$, determined by the displacement of components I and III, is apparent from FIG. 4.

TABLE Ia

| | $f$ | $d3$ | $d5$ | $d7$ | $\Sigma d$ |
|---|---|---|---|---|---|
| $f_{min}f$ | 9.5 | 0.41 | 23.10 | 0.40 | 71.78 |
| $f_{med}f$ | 15.0 | 8.70 | 14.81 | 8.69 | 80.07 |
| $f_{max}f$ | 23.0 | 16.0 | 7.51 | 15.99 | 87.37 |

The individual focal lengths of components I–IV are as follows:

$$f_{I}=+66.6\text{ mm.}$$
$$f_{II}=-21.25\text{ mm.}$$
$$f_{III}=+29.88\text{ mm.}$$
$$f_{IV}=+16.44\text{ mm.}$$

The fixed diaphragm space $d9$ between elements L5 and L6 in FIG. 1, computed as the sum of $d9a$, $d9b$ and $d9c$, has the value of 17.86 mm. If the prism P is omitted, this value would have to be diminished by $$d\frac{n-1}{n}$$

$d$ being the prism thickness $d9b$ and $n$ being the value of the refractive index $n_d$ as given in Table I for the prism P. In succeeding embodiments described hereinafter with reference to FIGS. 2 and 3, in which the prism has been omitted, such prism could also be inserted by a corresponding lengthening of the respective diaphragm spaces, as is well known in the art, to leave unaltered the path of the light rays reaching the basic objective designated L6 to L9.

Figure 2:
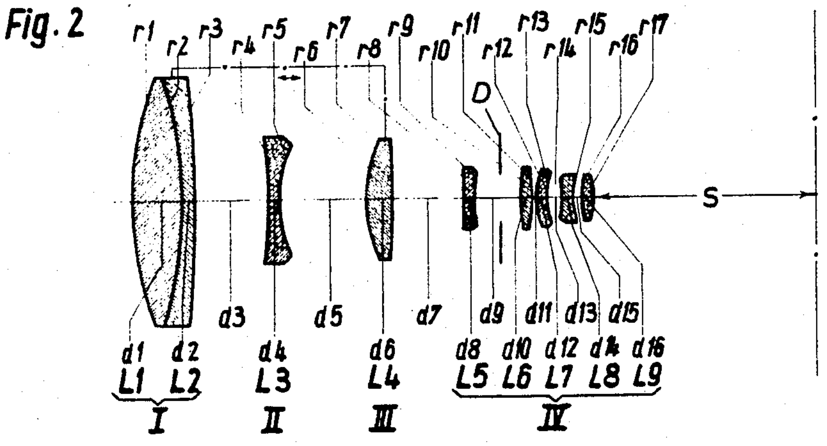
FIGS. 2 and 3 are views similar to FIG. 1, showing two other embodiments.
Figure 3:
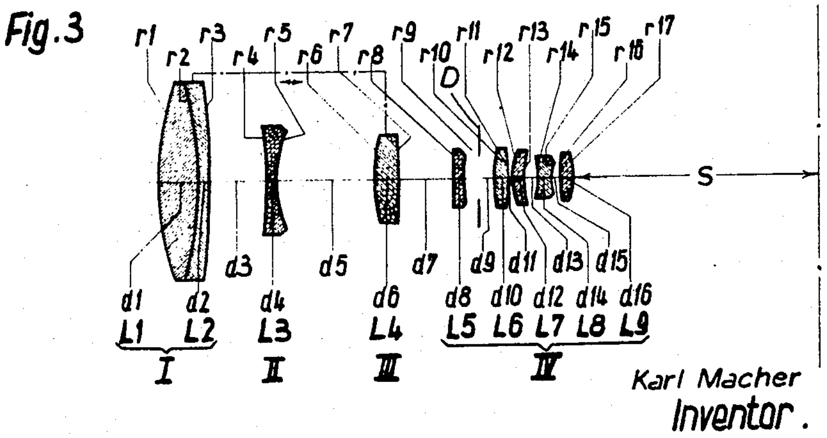

The objectives shown in FIGS. 2 and 3 are otherwise similar to that of FIG. 1 and the same designations have been used for their respective components.

The system of FIG. 2 has a mean overall focal length $f$ of mean value $f_{med}=17$ mm., variable from $f_{min}=10$ mm. to $f_{max}=30$ mm., and a practically constant back-focal length $s=9.96$ mm. Its relative aperture is 1:1.8.

TABLE II

| Lenses | | Radii | Thicknesses and Separations | $n_d$ | $\nu$ | $\Delta n/r$ |
|---|---|---|---|---|---|---|
| I | L1 | $r1=+50.27$ | | | | +0.012702 |
| | | | $d1=7.30$ | 1.6385 | 55.5 | |
| | | $r2=-58.56$ | | | | −0.0021048 |
| | L2 | | $d2=1.20$ | 1.7618 | 27.0 | |
| | | $r3=-198.15$ | | | | +0.0038445 |
| | | | $d3=10.53$ | Air space (variable) | | |
| II | L3 | $r4=-66.49$ | | | | −0.0101955 |
| | | | $d4=1.50$ | 1.6779 | 55.5 | |
| | | $r5=+18.90$ | | | | −0.0358677 |
| | | | $d5=12.83$ | Air space (variable) | | |
| III | L4 | $r6=+20.01$ | | | | +0.10310994 |
| | | | $d6=4.0$ | 1.6223 | 53.1 | |
| | | $r7=-149.90$ | | | | +0.0041514 |
| | | | $d7=10.37$ | Air space (variable) | | |
| IV | L5 | $r8=-78.39$ | | | | −0.0079144 |
| | | | $d8=1.50$ | 1.6204 | 60.3 | |
| | | $r9=+29.23$ | | | | −0.0212251 |
| | | | $d9=6.80$ | Diaphragm space | | |
| | L6 | $r10=+20.76$ | | | | +0.0326541 |
| | | | $d10=1.87$ | 1.6779 | 55.5 | |
| | | $r11=-36.93$ | | | | +0.0183563 |
| | | | $d11=0.04$ | Air space | | |
| | L7 | $r12=+8.445$ | | | | +0.0825103 |
| | | | $d12=2.0$ | 1.6968 | 55.6 | |
| | | $r13=+14.06$ | | | | −0.0495590 |
| | | | $d13=2.05$ | Air space | | |
| | L8 | $r14=-14.77$ | | | | −0.0531279 |
| | | | $d14=1.70$ | 1.7847 | 26.1 | |
| | | $r15=+7.785$ | | | | −0.1007964 |
| | | | $d15=1.10$ | Air space | | |
| | L9 | $r16=+14.01$ | | | | +0.0531049 |
| | | | $d16=1.96$ | 1.7440 | 44.9 | |
| | | $r17=-9.695$ | | | | +0.0767405 |
| | | | $\Sigma d=66.75$ | | | |

Figure 5:
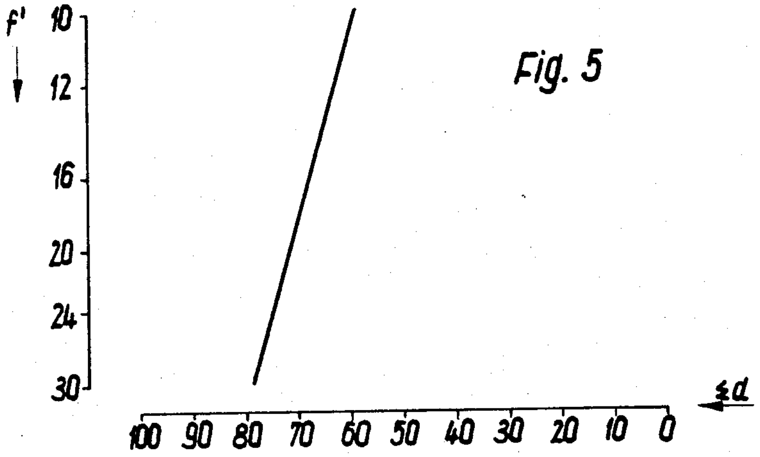

Again, the air spaces $d3$, $d5$ and $d7$ are variable about their mean values, given in Table II, between limits indicated below in Table II*a*. The substantially linear relationship between the total axial length $\Sigma d$ and the overall focal length $f$ in the system of FIG. 2 has been illustrated in the graph of FIG. 5.

TABLE IIa

| | $f$ | $d3$ | $d5$ | $d7$ | $\Sigma d$ |
|---|---|---|---|---|---|
| $f_{min}$ | 10.0 | 0.96 | 22.40 | 0.80 | 57.18 |
| $f_{med}$ | 17.0 | 10.53 | 12.83 | 10.37 | 66.75 |
| $f_{max}$ | 30.0 | 20.22 | 3.14 | 20.06 | 76.44 |

The individual focal lengths of components I–IV of the system of FIG. 2 are as follows:

$$f_{I}=+69.85\text{ mm.}$$
$$f_{II}=-21.56\text{ mm.}$$
$$f_{III}=+28.63\text{ mm.}$$
$$f_{IV}=+15.39\text{ mm.}$$

The system of Table IV has a relative aperture of 1:1.8, ture 1:1.9, with a back-focal length $s$ of 10 mm. and with an overall focal length $f$ of mean value $f_{med}=$ 16 mm., variable between $f_{min}=10$ mm. and $f_{max}=27$ mm. Its parameters are given in the following Table III:

TABLE III

| Lenses | | Radii | Thicknesses and Separations | $n_d$ | $\nu$ | $\Delta n/r$ |
|---|---|---|---|---|---|---|
| I | L1 | $r1=+44.02$ | | | | +0.0140938 |
| | | | $d1=5.80$ | 1.6204 | 60.3 | |
| | | $r2=-50.64$ | | | | −0.0027920 |
| | L2 | | $d2=1.70$ | 1.7618 | 27.0 | |
| | | $r3=-129.78$ | | | | +0.0058699 |
| | | | $d3=8.13$ | Air space (variable) | | |
| II | L3 | $r4=-61.28$ | | | | −0.0116351 |
| | | | $d4=1.50$ | 1.7130 | 53.9 | |
| | | $r5=+17.57$ | | | | −0.0403508 |
| | | | $d5=13.89$ | Air space (variable) | | |
| III | L4 | $r6=+22.02$ | | | | +0.0314940 |
| | | | $d6=4.0$ | 1.6935 | 53.4 | |
| | | $r7=-136.28$ | | | | +0.0050887 |
| | | | $d7=7.96$ | Air space (variable) | | |
| IV | L5 | $r8=\infty$ | | | | ------------ |
| | | | $d8=1.50$ | 1.4645 | 65.8 | |
| | | $r9=+18.64$ | | | | −0.0249195 |
| | | | $d9=4.50$ | Diaphragm space | | |
| | L6 | $r10=+22.42$ | | | | +0.0319803 |
| | | | $d10=2.0$ | 1.7170 | 47.9 | |
| | | $r11=-45.81$ | | | | +0.0156516 |
| | | | $d11=0.04$ | Air space | | |
| | L7 | $r12=+9.455$ | | | | +0.0754098 |
| | | | $d12=2.10$ | 1.7130 | 53.9 | |
| | | $r13=+16.44$ | | | | −0.0433698 |
| | | | $d13=2.15$ | Air space | | |
| | L8 | $r14=-15.01$ | | | | −0.0522784 |
| | | | $d14=1.80$ | 1.7847 | 26.1 | |
| | | $r15=+8.165$ | | | | −0.0961053 |
| | | | $d15=1.20$ | Air space | | |
| | L9 | $r16=+15.01$ | | | | +0.0488674 |
| | | | $d16=2.10$ | 1.7335 | 51.0 | |
| | | $r17=-9.55$ | | | | +0.0768062 |
| | | | $\Sigma d=60.37$ | | | |

Figure 6:
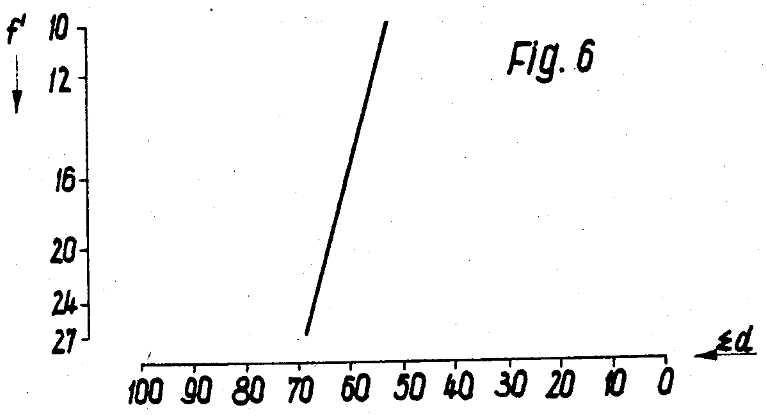

As in the preceding embodiments, the air spaces $d3$, $d5$ and $d7$ are variable together with the total axial length $\Sigma d$ within limits set forth in the following Table III*a*, the substantially linear relationship between $\Sigma d$ and $f$ being apparent from the graph of FIG. 6.

TABLE IIIa

| | $f$ | $d3$ | $d5$ | $d7$ | $\Sigma d$ |
|---|---|---|---|---|---|
| $f_{min}$ | 10 | 0.57 | 21.45 | 0.40 | 52.81 |
| $f_{med}$ | 16 | 8.13 | 13.89 | 7.96 | 60.37 |
| $f_{max}$ | 27 | 15.36 | 6.66 | 15.19 | 67.60 |

The individual focal lengths of components I–IV of the system of FIG. 3 are as follows:

$$f_{I}=+58.9$$
$$f_{II}=-19.0$$
$$f_{III}=+27.5$$
$$f_{IV}=+17.3$$

Computation of the focal length of the group preceding the diaphragm space $d9$, consisting of components I to III and lens number L5, shows that this focal length is negative and substantially exceeds, in its absolute value, the magnitude of $f_{max}$ given for any of the systems of the preceding tables. The dispersive power of this group, it will be further noted, progressively decreases from the embodiment of FIG. 1 to that of FIG. 3, the group of FIG. 3 being nearly afocal.

Following is a further numerical example for a system, of the type shown in FIG. 2, whose parameters are chosen about five times as large as those of the preceding examples but which nevertheless satisfy the aforestated preferred relationships between the individual focal lengths $f_I$ to $f_{IV}$ and the radii $r1$ to $r17$ with the exception of radii $r2$, $r7$, $r8$ and $r9$.

TABLE IV

| Lens | | Radii | Thicknesses and Separations | $n_d$ | $\nu$ |
|---|---|---|---|---|---|
| I | L1 | $r1$ = +320.50 | | | |
| | | | $d1$ = 44.50 | 1.67790 | 55.5 |
| | L2 | $r2$ = −232.45 | | | |
| | | | $d2$ = 6.00 | 1.76180 | 27.0 |
| | | $r3$ = −665.90 | | | |
| | | | $d3$ = 75.10 | Air space (variable) | |
| II | L3 | $r4$ = −332.45 | | | |
| | | | $d4$ = 10.00 | 1.67003 | 47.2 |
| | | $r5$ = +88.75 | | | |
| | | | $d5$ = 47.65 | Air space (variable) | |
| III | L4 | $r6$ = +103.05 | | | |
| | | | $d6$ = 20.00 | 1.62364 | 36.8 |
| | | $r7$ = −441.80 | | | |
| | | | $d7$ = 64.35 | Air space (variable) | |
| IV | L5 | $r8$ = −215.00 | | | |
| | | | $d8$ = 7.50 | 1.62004 | 36.3 |
| | | $r9$ = +211.45 | | | |
| | | | $d9$ = 33.95 | Diaphragm space | |
| | L6 | $r10$ = +105.55 | | | |
| | | | $d10$ = 9.50 | 1.67790 | 55.5 |
| | | $r11$ = −187.80 | | | |
| | | | $d11$ = 0.20 | Air space | |
| | L7 | $r12$ = +40.13 | | | |
| | | | $d12$ = 10.25 | 1.69680 | 55.6 |
| | | $r13$ = +62.65 | | | |
| | | | $d13$ = 8.00 | Air space | |
| | L8 | $r14$ = −75.05 | | | |
| | | | $d14$ = 11.10 | 1.78470 | 26.1 |
| | | $r15$ = +39.45 | | | |
| | | | $d15$ = 5.60 | Air space | |
| | L9 | $r16$ = +64.20 | | | |
| | | | $d16$ = 10.00 | 1.74400 | 44.9 |
| | | $r17$ = −49.55 | | | |

The system of Table IV has a relative aperture of 1:1.8, a back-focal length $s$=49 mm. and an overall focal length $f$ variable between $f_{min}$=50 mm. and $f_{max}$=150 mm. An intermediate focal length of 100 mm. is the one for which the variable air spaces $d3$, $d5$ and $d7$ have been indicated in Example IV. The extreme values of $f$ are attained, as in the preceding examples, when these variable air spaces are changed by a displacement of the movable members I and III to substantially the physical limits of their axial adjustability.

The individual focal lengths of the components of the system represented by Table IX have the following values:

$$f_I=+350.8 \text{ mm.}$$
$$f_{II}=-103.1 \text{ mm.}$$
$$f_{III}=+135.1 \text{ mm.}$$
$$f_{IV}=+73.3 \text{ mm.}$$

It should be noted that the fixed negative lens member L5 immediately preceding the diaphragm space $d9$ is of such power, in the examples given hereinabove, as to increase the back-focal length of the four-lens group L6 to L9 by a minimum of approximately 50%.

Furthermore, the absolute value $|f_{II}|$ of the individual focal length of the second component ranges between $|f_{IV}|$ and $1.5|f_{IV}|$, the value of $|f_{IV}|$ ranging in turn between 18% and 30% of $|f_I|$. These relationships insure a compact arrangement while affording the large aperture ratios of 1:1.8 or 1:1.9 set forth above.

I claim:

1. A varifocal objective system comprising an axially movable positive first component, a fixed negative second component, an axially movable positive third component ganged with said first component for concurrent displacement therewith, and a fixed fourth component consisting of a plurality of air-spaced lens members including a forwardly positioned negative lens member and positively refracting lens means separated from said negative lens member by a diaphragm space, said first component being a biconvex doublet, the system having a mean overall focal length of 15 linear units, the radii $r1$ to $r9$ of lenses (L1), (L2), constituting said doublet, and of lenses (L3), (L4) and (L5), respectively constituting said second component, said third component and said negative lens member of said fourth component, their thicknesses and separations $d1$ to $d8$, their refractive indices $n_d$ and their Abbé numbers $\nu$ having numerical values substantially as given in the immediately following table:

| Lenses | Radii | Thicknesses and Separations | $n_d$ | $\nu$ |
|---|---|---|---|---|
| L1 | $r1$=+50.91 | | | |
| | | $d1$=8.85 | 1.6204 | 60.3 |
| | $r2$=−55.61 | | | |
| | | $d2$=1.90 | 1.8052 | 25.5 |
| L2 | $r3$=−125.86 | | | |
| | | $d3$=8.70 | Air space (variable) | |
| | $r4$=−327.60 | | | |
| | | $d4$=1.50 | 1.6204 | 60.3 |
| L3 | $r5$=+13.82 | | | |
| | | $d5$=14.81 | Air space (variable) | |
| | $r6$=+17.38 | | | |
| | | $d6$=3.60 | 1.5785 | 41.7 |
| L4 | $r7$=∞ | | | |
| | | $d7$=8.69 | Air space (variable) | |
| | $r8$=+72.09 | | | |
| L5 | | $d8$=1.0 | 1.6204 | 60.3 |
| | $r9$=+12.44 | | | |

said positively refracting lens means consisting of four air-spaced singlets (L6), (L7), (L8), (L9) with radii $r10$ to $r17$, thicknesses and separations $d10$ to $d16$, refractive indices $n_d$ and Abbé numbers $\nu$ having numerical values substantially as given in the following table:

| Lenses | Radii | Thicknesses and Separations | $n_d$ | $\nu$ |
|---|---|---|---|---|
| L6 | $r10$=+22.02 | | | |
| | | $d10$=1.92 | 1.7844 | 43.8 |
| | $r11$=−57.37 | | | |
| | | $d11$=0.04 | Air space | |
| L7 | $r12$=+14.49 | | | |
| | | $d12$=2.15 | 1.7440 | 44.9 |
| | $r13$=+37.67 | | | |
| | | $d13$=1.0 | Air space | |
| L8 | $r14$=−27.65 | | | |
| | | $d14$=3.90 | 1.8052 | 25.5 |
| | $r15$=+9.89 | | | |
| | | $d15$=1.30 | Air space | |
| L9 | $r16$=+15.87 | | | |
| | | $d16$=2.85 | 1.7130 | 53.9 |
| | $r17$=−13.58 | | | |

2. A varifocal objective system comprising an axially movable positive first component, a fixed negative second component, an axially movable positive third component ganged with said first component for concurrent displacement therewith, and a fixed fourth component consisting of a plurality of air-spaced lens members including a forwardly positioned negative lens member and positively refracting lens means separated from said negative lens member by a diaphragm space, said first component being a biconvex doublet, the system having a mean overall focal length of 17 linear units, the radii $r1$ to $r9$ of lenses (L1), (L2), constituting said doublet, and of lenses (L3), (L4) and (L5), respectively constituting said second component, said third component and said negative lens member of said fourth component, their thicknesses and separations $d1$ to $d8$, their refractive indices $n_d$ and their Abbé numbers $\nu$ having numerical values substantially as given in the immediately following table:

| Lenses | Radii | Thicknesses and Separations | $n_d$ | $\nu$ |
|---|---|---|---|---|
| L1 | $r1=+50.27$ | $d1=7.30$ | 1.6385 | 55.5 |
| L2 | $r2=-58.56$ | $d2=1.20$ | 1.7618 | 27.0 |
| | $r3=-198.15$ | $d3=10.53$ | Air space | (variable) |
| L3 | $r4=-66.49$ | $d4=1.50$ | 1.6779 | 55.5 |
| | $r5=+18.90$ | $d5=12.83$ | Air space | (variable) |
| L4 | $r6=+20.01$ | $d6=4.0$ | 1.6223 | 53.1 |
| | $r7=-149.90$ | $d7=10.37$ | Air space | (variable) |
| L5 | $r8=-78.39$ | $d8=1.50$ | 1.6204 | 60.3 |
| | $r9=+29.23$ | | | |

said positively refracting lens means consisting of four air-spaced singlets (L6), (L7), (L8), (L9) with radii $r10$ to $r17$, thicknesses and separations $d10$ to $d16$, refractive indices $n_d$ and Abbé numbers $\nu$ having numerical values substantially as given in the following table:

| Lenses | Radii | Thicknesses and Separations | $n_d$ | $\nu$ |
|---|---|---|---|---|
| L6 | $r10=+20.76$ | $d10=1.87$ | 1.6779 | 55.5 |
| | $r11=-36.93$ | $d11=0.04$ | Air space | |
| L7 | $r12=+8.445$ | $d12=2.0$ | 1.6968 | 55.6 |
| | $r13=+14.06$ | $d13=2.05$ | Air space | |
| L8 | $r14=-14.77$ | $d14=1.70$ | 1.7847 | 26.1 |
| | $r15=+7.785$ | $d15=1.10$ | Air space | |
| L9 | $r16=+14.01$ | $d16=1.96$ | 1.7440 | 44.9 |
| | $r17=-9.695$ | | | |

3. A varifocal objective system comprising an axially movable positive first component, a fixed negative second component, an axially movable positive third component ganged with said first component for concurrent displacement therewith, and a fixed fourth component consisting of a plurality of air-spaced lens members including a forwardly positioned negative lens member and positively refracting lens means separated from said negative lens member by a diaphragm space, said first component being a convex doublet, the system having a mean overall focal length of 16 linear units, the radii $r1$ to $r9$ of lenses (L1), (L2), constituting said doublet, and of lenses (L3), (L4) and (L5), respectively constituting said second component, said third component and said negative lens member of said fourth component, their thicknesses and separations $d1$ to $d8$, their refractive indices $n_d$ and their Abbé numbers $\nu$ having numerical values substantially as given in the following table:

| Lenses | Radii | Thicknesses and Separations | $n_d$ | $\nu$ |
|---|---|---|---|---|
| L1 | $r1=+44.02$ | $d1=5.80$ | 1.6204 | 60.3 |
| L2 | $r2=-50.64$ | $d2=1.70$ | 1.7618 | 27.0 |
| | $r3=-129.78$ | $d3=8.13$ | Air space | (variable) |
| L3 | $r4=-61.28$ | $d4=1.50$ | 1.7130 | 53.9 |
| | $r5=+17.57$ | $d5=13.89$ | Air space | (variable) |
| L4 | $r6=+22.02$ | $d6=4.0$ | 1.6935 | 53.4 |
| | $r7=-136.28$ | $d7=7.96$ | Air space | (variable) |
| L5 | $r8=\infty$ | $d8=1.50$ | 1.4645 | 65.8 |
| | $r9=+18.64$ | | | |

said positively refracting lens means consisting of four air-spaced singlets (L6), (L7), (L8), (L9) with radii $r10$ to $r17$, thicknesses and separations $d10$ to $d16$, refractive indices $n_d$ and Abbé numbers $\nu$ having numerical values substantially as given in the following table:

| Lenses | Radii | Thicknesses and Separations | $n_d$ | $\nu$ |
|---|---|---|---|---|
| L6 | $r10=+22.42$ | $d10=2.0$ | 1.7170 | 47.9 |
| | $r11=-45.81$ | $d11=0.04$ | Air space | |
| L7 | $r12=+9.455$ | $d12=2.10$ | 1.7130 | 53.9 |
| | $r13=+16.44$ | $d13=2.15$ | Air space | |
| L8 | $r14=-15.01$ | $d14=1.80$ | 1.7847 | 26.1 |
| | $r15=+8.165$ | $d15=1.20$ | Air space | |
| L9 | $r16=+15.01$ | $d16=2.10$ | 1.7335 | 51.0 |
| | $r17=-9.55$ | | | |

4. A varifocal objective system comprising an axially movable positive first component, a fixed negative second component, an axially movable positive third component ganged with said first component for concurrent displacement therewith, and a fixed fourth component consisting of a plurality of air-spaced lens members including a forwardly positioned negative lens member and positively refracting lens means separated from said negative lens member by a diaphragm space, said first component being a biconvex doublet, the system having an intermediate focal length of 100 linear units, the radii $r1$ to $r9$ of lenses (L1), (L2) constituting said doublet, and of lenses (L3), (L4) and (L5), respectively constituting said second component, said third component and said negative lens member of said fourth component, their thickness and separations $d1$ to $d8$, their refractive indices $n_d$ and their Abbé numbers $\nu$ having numerical values substantially as given in the immediately following table:

| Lenses | Radii | Thicknesses and Separations | $n_d$ | $\nu$ |
|---|---|---|---|---|
| L1 | $r1=+320.50$ | $d1=44.50$ | 1.67790 | 55.5 |
| L2 | $r2=-232.45$ | $d2=6.00$ | 1.76180 | 27.0 |
| | $r3=-665.90$ | $d3=75.10$ | Air space | (variable) |
| L3 | $r4=-332.45$ | $d4=10.00$ | 1.67003 | 47.2 |
| | $r5=+88.75$ | $d5=47.65$ | Air space | (variable) |
| L4 | $r6=+103.05$ | $d6=20.00$ | 1.62364 | 36.8 |
| | $r7=-441.80$ | $d7=64.35$ | Air space | (variable) |
| L5 | $r8=-215.00$ | $d8=7.50$ | 1.62004 | 36.3 |
| | $r9=+211.45$ | | | |

said positively refracting lens means consisting of four air-spaced singlets (L6), (L7), (L8), (L9) with radii $r10$ to $r17$, thicknesses and separations $d10$ to $d16$, refractive indices $n_d$ and Abbé numbers $\nu$ having numerical values substantially as given in the following table:

| Lenses | Radii | Thicknesses and Separations | $n_d$ | $\nu$ |
|---|---|---|---|---|
| L6 | r10=+105.55 | d10=9.50 | 1.67790 | 55.5 |
| | r11=−187.80 | d11=0.20 | Air space | |
| L7 | r12=+40.13 | d12=10.25 | 1.69680 | 55.6 |
| | r13=+62.65 | d13=8.00 | Air space | |
| L8 | r14=−75.05 | d14=11.10 | 1.78470 | 26.1 |
| | r15=+39.45 | d15=5.60 | Air space | |
| L9 | r16=+64.20 | d16=10.00 | 1.74400 | 44.9 |
| | r17=−49.55 | | | |

References Cited

UNITED STATES PATENTS 2,925,010 2/1960 Turula et al. ---------- 350—184
2,984,155 5/1961 Schwartz et al. -------- 350—184
2,997,921 8/1961 Lynch et al. ---------- 350—184
3,307,898 3/1967 Hudson -------------- 350—184

DAVID SCHONBERG, *Primary Examiner*

R. J. STERN, *Assistant Examiner.*

U.S. Cl. X.R.

350—184, 214